United States Patent
Grunwald et al.

(10) Patent No.: US 11,841,492 B2
(45) Date of Patent: Dec. 12, 2023

(54) HEATED STAGE ASSEMBLY FOR HIGH TEMPERATURE FLUORESCENCE MICROSCOPY

(71) Applicant: University of Massachusetts, Boston, MA (US)

(72) Inventors: David Grunwald, Worcester, MA (US); Maximiliaan Huisman, North Brookfield, MA (US); Karina Jouravleva, Worcester, MA (US); Carlas Smith, Delft (NL); Phillip D. Zamore, Northborough, MA (US)

(73) Assignee: UNIVERSITY OF MASSACHUSETTS, Boston, MA (US)

( * ) Notice: Subject to any disclaimer, the term of this patent is extended or adjusted under 35 U.S.C. 154(b) by 277 days.

(21) Appl. No.: 17/274,625

(22) PCT Filed: Sep. 13, 2019

(86) PCT No.: PCT/US2019/051054
§ 371 (c)(1),
(2) Date: Mar. 9, 2021

(87) PCT Pub. No.: WO2020/056291
PCT Pub. Date: Mar. 19, 2020

(65) Prior Publication Data
US 2022/0050282 A1 Feb. 17, 2022

Related U.S. Application Data

(60) Provisional application No. 62/731,513, filed on Sep. 14, 2018.

(51) Int. Cl.
*G02B 21/26* (2006.01)
*G02B 21/00* (2006.01)
(Continued)

(52) U.S. Cl.
CPC ............ *G02B 21/30* (2013.01); *G02B 21/06* (2013.01); *G02B 21/26* (2013.01)

(58) Field of Classification Search
CPC ............... G02B 21/00; G02B 21/0016; G02B 21/0076; G02B 21/0088; G02B 21/16;
(Continued)

(56) References Cited

U.S. PATENT DOCUMENTS 5,181,382 A    1/1993 Middlebrook
5,343,018 A    8/1994 Limbach
(Continued)

FOREIGN PATENT DOCUMENTS

EP    1795940 A1    6/2007

OTHER PUBLICATIONS

Supplementary European Search Report for EP 19860159 dated May 11, 2022.
(Continued)

*Primary Examiner* — Thong Q Nguyen
(74) *Attorney, Agent, or Firm* — Hamilton, Brook, Smith & Reynolds, P.C.

(57) ABSTRACT

The invention is directed to a heated stage assembly that can achieve high temperatures (i.e., 40 degrees Celsius and higher and more specifically, 55 degrees Celsius and higher) for use in microscopy including fluorescence microscopy. The microscope stage heater assembly includes a mounting adapter element, a sample holder element mounted within the mounting adapter element, one or more heating elements attached to the sample holder element, and an optical window holder element disposed on a surface of the sample holder element that encloses an optical window element. The optical window element may be in contact with a
(Continued)

microscope sample such that the optical window element is heated by the sample holder element to uniformly distribute heat to the specimen.

14 Claims, 5 Drawing Sheets

(51) Int. Cl.
*G02B 21/30* (2006.01)
*G02B 21/06* (2006.01)

(58) Field of Classification Search
CPC ........ G02B 21/24; G02B 21/26; G02B 21/30; G02B 7/00; G02B 7/008; G02B 7/028; G02B 7/181; G02B 7/1815
USPC .......................... 359/368, 391–398, 512, 820

See application file for complete search history.

(56) References Cited

U.S. PATENT DOCUMENTS

| 5,552,321 | A | * | 9/1996 | Focht | ........................ B01L 7/00 359/395 |
| 2008/0174862 | A1 | | 7/2008 | Focht | |
| 2015/0022882 | A1 | | 1/2015 | Ue et al. | |
| 2015/0293341 | A1 | | 10/2015 | Kram et al. | |

OTHER PUBLICATIONS

International Search Report for International Application No. PCT/US19/51054, entitled "Heated Stage Assembly For High Temperature Fluorescence Microscopy." dated Dec. 4, 2019.
Ettinger, A et al. "Fluorescence live cell imaging"; Methods in Cell Biology, vol. 123; Publication [online]. Jan. 1, 2015 (retrieved Nov. 12, 2019). Retrieved from the Internet: <URL: https://www.ncbi.nlm.nih.gov/pubmed/24974023>; pp. 77-94.
International Preliminary Report on Patentability for PCT/US2019/051054 dated Mar. 9, 2021, title "Heated Stage Assembly for High Temperature Fluorescence Microscopy".

* cited by examiner

HEATED STAGE ASSEMBLY FOR HIGH TEMPERATURE FLUORESCENCE MICROSCOPY

CROSS REFERENCE TO RELATED APPLICATIONS

This application is the U.S. National Stage of International Application No. PCT/US2019/051054, filed Sep. 13, 2019, which designates the U.S., published in English, and claims the benefit of U.S. Provisional Application No. 62/731,513, filed Sep. 14, 2018. The entire teachings of the above applications are incorporated herein by reference.

FIELD OF INVENTION

The invention is directed to a heated stage assembly for use in microscopy. More specifically, the invention is directed to a heated stage assembly that can achieve high temperatures (i.e., 40 degrees Celsius and higher and more specifically, 55 degrees Celsius and higher).

BACKGROUND OF THE INVENTION

Observation of a specimen is an essential part of scientific discovery in many fields of study, and in particular, biology and medicine. For purposes of this application, the terms "specimen", "sample" and "object" are used interchangeably and refer to that which is the subject of examination or experimentation. While certain specimens may be easy to observe without assistance of machinery, for example, a wound on an arm, other specimens, such as the subcellular components of Eukaryotic cells, may be too small to observe with the eye alone. Thus, microscopy observations are important.

Most microscopes include an eyepiece, an objective lens, and a mechanical stage or stage holder. A specimen is held in place on the stage holder and positioned in the path of a light source. Typically, specimens are held in place using a slide holder or a petri dish. The specimen is viewable through an objective lens configured to produce a magnified image.

There are many types of microscopes. An optical microscope uses a light source that passes light through a sample to produce an image of the sample. A fluorescence microscope uses fluorescence and phosphorescence of a sample instead of, or in addition to, light scattering, reflection, and attenuation or absorption to produce an image of the sample. An electron microscope uses a beam of accelerated electrons as its source of illumination to produce an image of the sample.

In contrast to light microscopy, fluorescence microscopy illuminates the sample through an objective lens with a narrow set of wavelengths of light. This light interacts with fluorophores in the sample which then emit light of a longer wavelength which comprises the image.

In many situations, it may be advantageous to observe a specimen (e.g., a cell culture) under certain conditions that may include heating a specimen to a particular temperature and maintaining that temperature for a duration of time. Heating a specimen to a desired temperature may be essential to collecting accurate observation data for the specimen. For example, 37 degrees Celsius is an optimum temperature of mammalian cells to remain healthy and retain physiological activity, i.e., normal metabolism, motility and growth. But it also may be advantageous to heat a sample above 37 degrees Celsius in order to observe, for example, the effects of a certain chemical reaction.

One method of heating a specimen involves the use of a stage heater. The mechanical stage of the microscope is heated along with the specimen. However, current stage heaters suffer from several disadvantages. For example, many known stage heaters warm up a specimen from the outside edge toward the center of the slide. This causes an uneven distribution of heat across the surface of the slide. This situation is compounded in microscopes employing oil immersion objective lenses. In oil immersion objective lenses, a drop of oil is placed between the lens and the specimen slide. With the oil immersion lens touching the slide, the lens may act as a heat sink drawing heat from the specimen. Thus, although the slide containing the specimen may be heated to the desired temperature, the area actually being observed, i.e., the area adjacent the objective lens, may be 3 to 12° cooler than the rest of the specimen due to the contact between the cooler objective lens and the slide. An effective specimen heating system must heat not only the specimen but also the objective lens of the microscope. This risks damage and optical degradation of the objective lens. Another disadvantage is that a stage heater may adversely impact the specimen and resultant data collected if the stage heater is mounted directly against the slide. Furthermore, the stage heater may lack sterility and contaminate the specimen. Or a material of the heater may be chemically reactive with the specimen. Moreover, the light transmission through the specimen may be diminished due to reflection/scattering of light caused by certain structure of the stage heater.

Accordingly, there is a need for a system and methods for use with fluorescence microscopy to heat a specimen at high temperatures, such as above 40 degrees Celsius and even 55 degrees Celsius and higher, without adversely affecting the quality of the data collected, damaging the microscope such as the objective lens, or compromising the integrity of the specimen. The invention satisfies this need.

SUMMARY OF THE INVENTION

The invention is directed to a stage heater assembly—also referred to as heated stage assembly—configured to heat specimens to high temperatures (≥40 degrees Celsius) for observation. The stage heater may be integrated with a microscope or available as an accessory that can be easily and quickly adapted to any microscope, including for example, an inverted microscope. Specifically, the stage heater according to the invention is configured to be inserted within a stage holder of a microscope and easily removable.

The heated stage assembly may uniformly heat a sample and the optical window up to temperatures greater than 40 degrees Celsius, for example up to and including 70 degrees Celsius.

The heated stage assembly may be used for many contemplated microscopy applications including those directed to fluorescence microscopy. As an example, one application of the invention may be used to analyze single-molecule binding assays. Binding of a single molecule to macromolecules allow the interrogation of individual macromolecules from a biological process using purified components or cellular extracts. The heated stage assembly and methods according to the invention can be used with single-molecule assays can report the order and kinetics of individual molecular interactions.

The microscope stage heater assembly includes a mounting adapter element and a sample holder element. The stage heater also includes one or more heating elements and an optical holder element. Suitable heating elements may include any heat source, for example, heating blankets, Peltier elements, water jackets, or other commercially available heating sources. The sample holder element is mounted within the mounting adapter element. The one or more heating elements are attached to one side of the sample holder element. A substrate or slide (including a sample or specimen) is placed on the other side of the sample holder element along with the optical holder element.

The optical window holder element contains one or more optical window elements. The optical window element is transparent allowing the transmission of light through the optical window and into the objective without causing light scattering or light reflection that may otherwise reduce the quality of the image. Additionally, a transparent optical window permits the excitation light to pass through the optical window without reflecting back into the objective that causes increased background signals. The optical window element may be in contact with a microscope sample or a coverslip over the sample that is located on a substrate.

It is contemplated that the optical window element is constructed of a thickness and/or density such that the heat capacity of the optical window element is greater than the dissipation of heat from the specimen. This may ensure that the optical window element transfers heat to the specimen.

One or more optical window elements may be stacked in a series in the optical window holder element to increase heat capacity. It is contemplated that a thermal coupling material such as an oil may be included between each of the optical window elements in series to increase heat transmittance between the optical window elements. The one or more optical window elements also may be removable from the optical window holder element to facilitate cleaning and/or sterilization.

It is also contemplated that the optical window element may provide additional functions. For example, the optical window element may include micro and nano structures on its surface. These micro and nano surface structures—such as reaction chambers and/or microfluidic channels—may be used, for example, to limit an experiment to a certain reaction volume or to increase the number of experiments that may be conducted in parallel. Such micro and nano structures may be created using techniques known in the art such as etching or engraving. Another function of the optical window element may include surface coatings configured to immobilize one or more molecules (e.g., DNA, RNA, proteins etc.) to capture, bind, or otherwise interact with one or more target molecules in a solution in contact with the coated surface. Surface coatings of the optical window element may be accomplished through techniques known in the art. Optionally, the surface coatings may be used in conjunctions with the micro and nano structures described above (e.g. a surface coating of reaction chamber).

The heated stage assembly is configured to be positioned within a stage holder of a microscope. The microscope stage holder includes or is connected to the objective, otherwise referred to as "objective" or "objective lens".

Heat is transferred from the heating elements to the sample holder element. The mounting adapter element of the heated stage assembly insulates the objective from the heat emitted from the heating elements. Insulating the microscope objective from heat prevents damage or optical degradation of the optical element.

The sample holder element transmits the heat simultaneously to the slide and the optical window holder element. The slide distributes heat to the specimen from the sides of the slide. Heat may further be distributed to the specimen from the bottom of the slide. Heat transmitted to the optical window holder element is then transferred to an optical window element disposed within the window holder element. The optical window element then may transfer heat to the top of the specimen. The optical window element may contact the specimen or coverslip located over the specimen to directly transfer heat to the specimen. It is contemplated that both the substrate and coverslip may be selected based upon their heat conducting and/or insulating properties. Heat is uniformly distributed to the sides, bottom, and or top of the specimen.

In order to quickly and easily transfer or distribute heat from the one or more heating elements to the specimen uniformly while protecting the objective, the mounting adapter element is constructed from an insulating material and the window holder element, optical window element, and the sample holder element are constructed from a conductive material.

Examples of insulating materials include, for example, polymers including polyoxymethylene such as Delrin®, fiberglass, cellulose. It is also contemplated that the mounting adapter element may be 3D printed, or injection molded out of any insulating material. Conductive materials include any metal or metal alloy, for example aluminum or copper. However, it is contemplated that the optical window is constructed from glass or a thermally conducting transparent plastic.

The temperature of the sample may be recorded through one or more temperature sensors, for example a K-type thermocouple. One or more temperature sensors may be positioned on top of the slide, on the sample, on the sample holder element, or between the slide and coverslip to record the temperature value. The sensors may be connected to a controller such as a Proportional-Integral-Derivative (PID) controller including solid-state relay that is also connected to the heating elements. The PIC including solid-state relay may automatically adjust the heat flow from the heating elements to the sample holder element to control the temperature of the sample.

Certain embodiments of the invention may include also the use of an optical collar element to heat the objective to a specific temperature. This may minimize the thermal gradient between the sample and objective that, in turn, may reduce the extent to which the objective may act as a heat sink affecting the distribution of heat in the sample. This provides for temperature uniformity throughout the specimen. Any heat source configured to heat the objective is contemplated.

An advantage of the invention is that specimens may be heated to higher temperatures (≥40 degrees Celsius) than have been previously achieved. Furthermore, the specimens may be heated uniformly from the top, sides, bottom. This homogenous heating of the sample is achieved while maintaining optical transparency and minimizing any background signal.

Another advantage of the invention is that the heated stage assembly stably positions the temperature-controlled sample over the objective. Another advantage of the invention is that the heated stage assembly may prevent the microscope itself and/or the specimen observed from being heated outside their respective recommended temperature zone. This not only may help to protect the objective, but also ensures a high quality image that is free of heat related aberrations.

Another advantage of the invention is that the sample heater may be mounted to most standard plate, dish, or microscope slide holders without the need for extra fixation materials.

The present invention and its attributes and advantages will be further understood and appreciated with reference to the detailed description below of presently contemplated embodiments, taken in conjunction with the accompanying drawings.

BRIEF DESCRIPTION OF THE DRAWINGS

The preferred embodiments of the invention will be described in conjunction with the appended drawings provided to illustrate and not to the limit the invention, where like designations denote like elements, and in which.

DETAILED DESCRIPTION OF THE INVENTION

The invention is directed to a heated stage assembly that can achieve high temperatures for use in microscopy including fluorescence microscopy. Although the invention is described in reference to fluorescence microscopy, any microscopy is contemplated in which a heated specimen is desired for observation, including for example, any type of optical microscope. It is contemplated that the heated stage assembly can heat a specimen to 40 degrees Celsius and higher and more specifically, 55 degrees Celsius and higher, and even up to and including 70 degrees Celsius.

Figure 1:
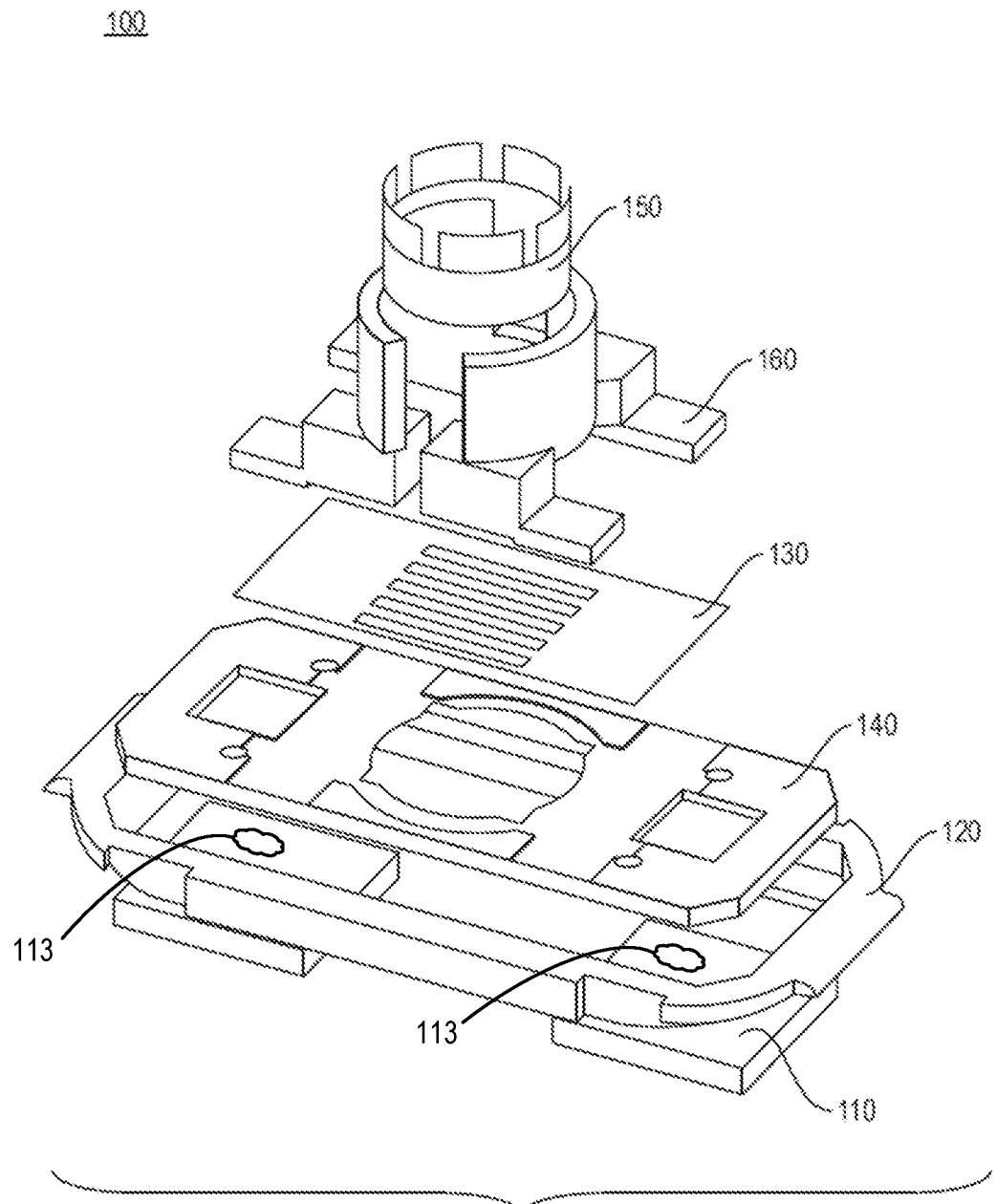
FIG. 1 is an exploded perspective view of a heated stage assembly according to an embodiment of the invention.

FIG. 1 is an exploded perspective view of a heated stage assembly 100 according to an embodiment of the invention. The assembly 100 comprises one or more heating elements 110, a mounting adapter element 120, a sample holder element 140, and an optical window holder element 160. The heated stage assembly 100 further includes an optical window element 150 and slide or substrate 130 onto which the sample is placed.

Figure 2A:
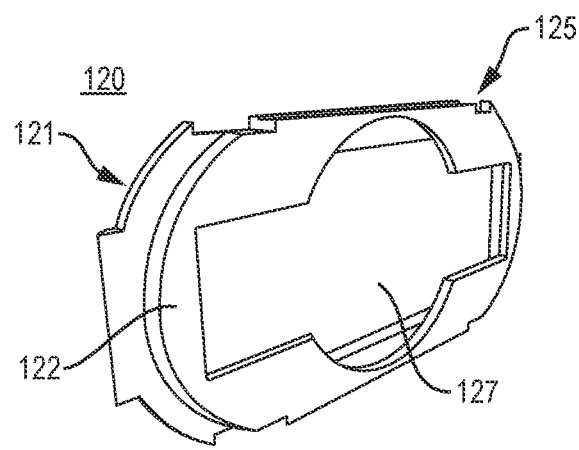
FIG. 2A is perspective view of the mounting adapter element of the stage heater illustrated in FIG. 1.

FIG. 2A is perspective view of the mounting adapter element 120 of the stage heater 100 illustrated in FIG. 1. The mounting adapter element 120 includes a front side 121 and back side 122. The front side 121 includes a pocket 125 and the back side 122 includes a centrally located opening 127.

Figure 2B:
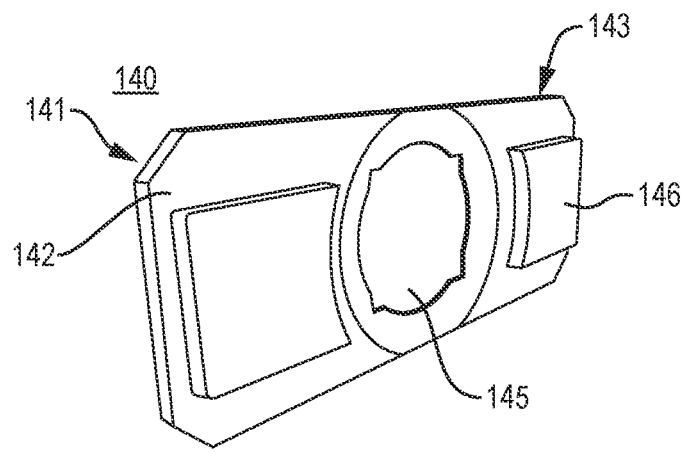
FIG. 2B is perspective view of the sample holder element of the stage heater illustrated in FIG. 1.

FIG. 2B is perspective view of the sample holder element 140 of the stage heater 100 illustrated in FIG. 1. The sample holder element 140 includes a first surface 141 and second surface 142 and further includes centrally located aperture 145. A sample receiving area 143 is located on the first surface 141 and pads 146 are located on the second surface 142.

Figure 2C:
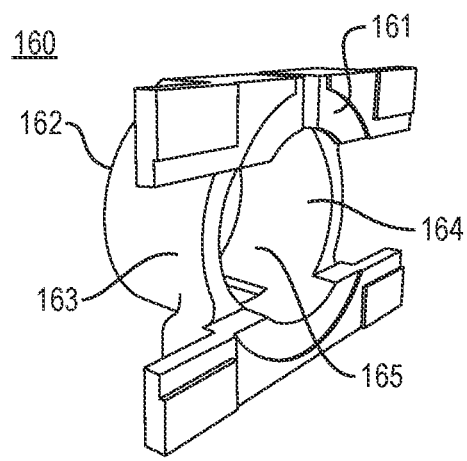
FIG. 2C is perspective view of the optical window holder element of the stage heater illustrated in FIG. 1.

FIG. 2C is perspective view of the optical window holder element 160 of the stage heater 100 illustrated in FIG. 1. The optical window holder element 160 comprises a base element 161 from which a conduit element 162 is connected. The conduit element 162 includes an outside surface 163 and an inside surface 164 that defines cavity 165.

The sample holder element 140 is mounted within the pocket 125 on the front side 121 of mounting adapter element 120. The slide 130 including specimen is positioned within the receiving area 143 of the sample holder element 140.

The base element 161 of the optical window holder element 160 is disposed on the first surface 141 of the sample holder element 140. The cavity 165 of the conduit element 162 is aligned with aperture 145 of the sample holder element 140. The cavity 165 of the optical window holder element 160 is sized and shaped to receive an optical window element 150. Specifically, one or more optical window elements 150 are located within the inside surface 164 of the conduit element 162.

Heating elements 110 are mounted under the back side 122 of the mounting adapter element 120 such that they are aligned with pads 146 of the sample holder. Each heating element 110 may be physically attached to a pad 146 or positioned such that it rests on a surface of the pad 146. For example, the heating elements 110 may be each connected to pads 146 using a transparent thermally conducting paste or fluid 113.

Figure 3:
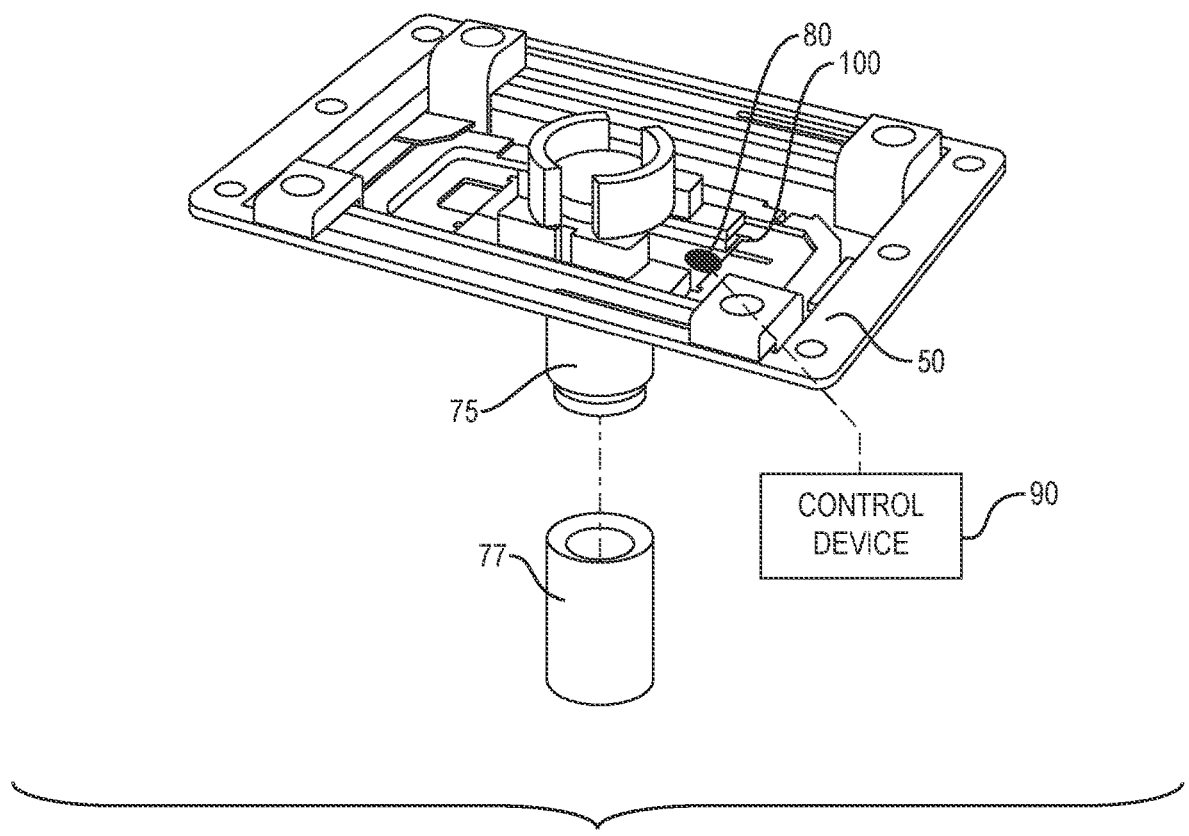
FIG. 3 is a perspective view of the heated stage assembly attached to a microscope stage holder according to an embodiment of the invention.
Figure 4:
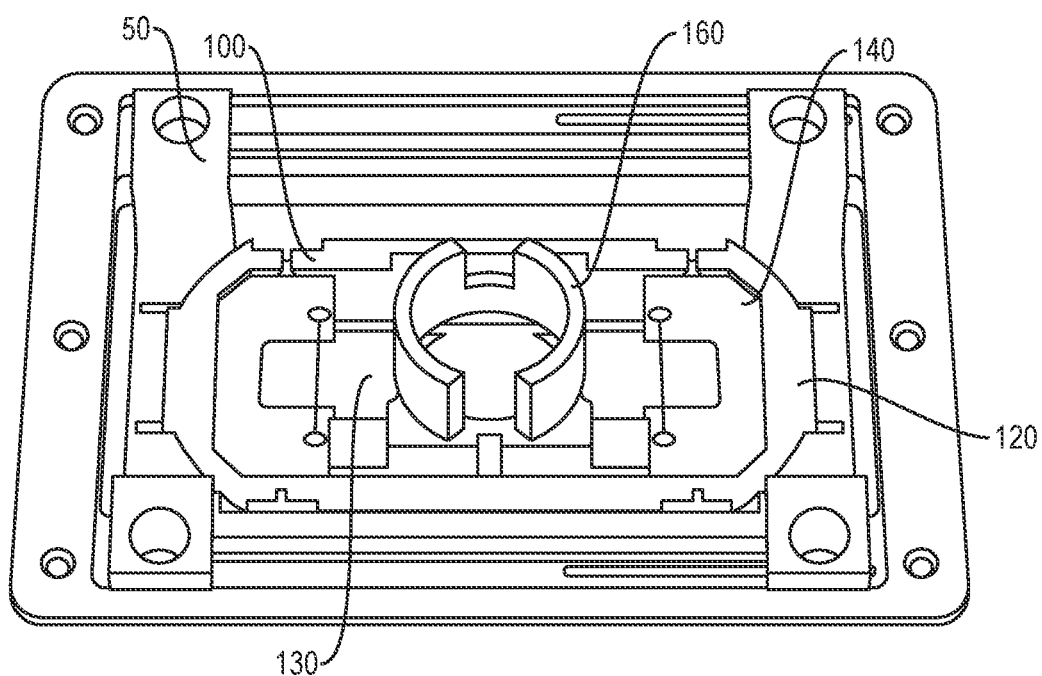
FIG. 4 is a top view of the heated stage assembly attached to a microscope stage holder according to an embodiment of the invention.
Figure 5:
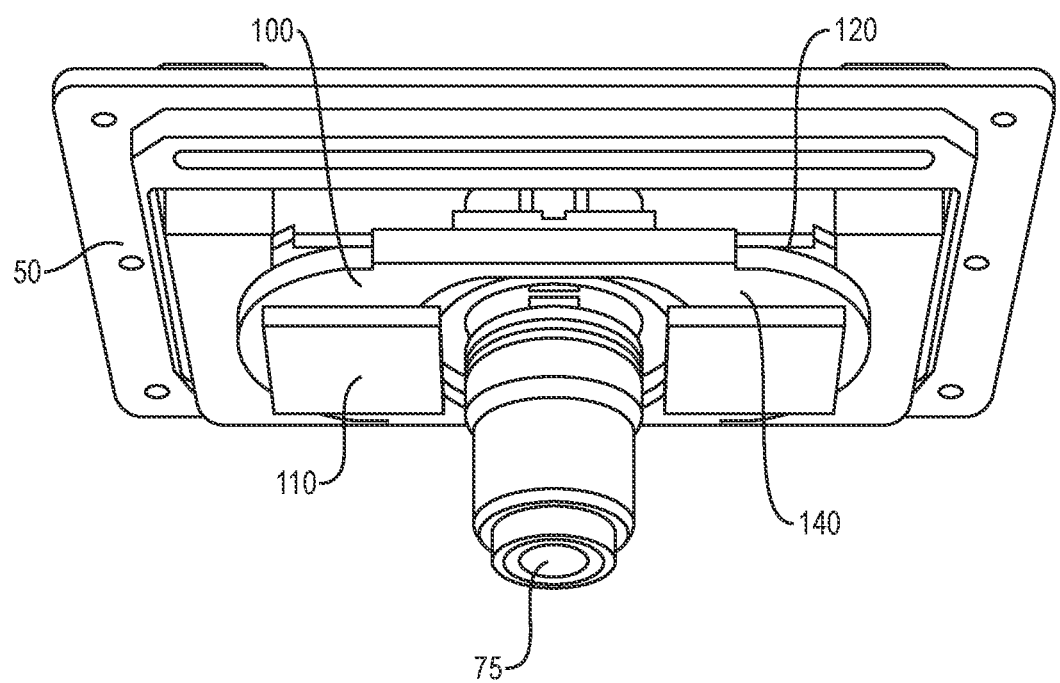
FIG. 5 is a bottom view of the heated stage assembly attached to a microscope stage holder according to an embodiment of the invention.

The heated stage assembly 100 is attached to a microscope stage holder 50 as shown in FIGS. 3-5. As shown in FIG. 3, the microscope stage holder 50 includes an objective lens or optical element 75.

The opening 127 of the mounting adapter element 120 and the aperture 145 of the sample holder element 140 are aligned for positioning over the objective 75 of the microscope stage holder 50 and in line with a light source of the microscope. The mounting adapter element 120 may be configured to insulate the microscope from heat transmitted during use while providing also a stable surface for mounting the heated stage assembly 100 with the microscope stage holder 50. The cavity 165 is also aligned with the opening 127 and aperture 145.

As shown in FIG. 3, a sensor 80 may be used to record the temperature value. Although the sensor 80 is shown as located on top of the slide 130, the sensor may be located on the sample holder element, or between the slide and coverslip to record the temperature value.

A controller 90 may be used to connect one or more sensors and the heating elements 110. The controller 90, such as a Proportional-Integral-Derivative (PID) controller may include solid-state relay that can automatically adjust the heat flow from the heating elements 110 to the sample holder element 140 thereby controlling the temperature of the sample.

Certain embodiments of the invention may include also the use of an optical collar element 77 as shown in FIG. 3. The optical collar element 77 is positioned over the optical element 75 and may be used to heat the optical element 75 to a specific temperature. This may minimize the thermal gradient between the sample and objective 75 that, in turn, may reduce the extent to which the objective 75 may act as a heat sink affecting the distribution of heat in the sample. This provides for temperature uniformity throughout the specimen.

Heating elements 110 apply a controlled amount of heat to the sample holder element 140. Heating elements 110 may be monitored by sensors and controlled by a Proportional- Integral-Derivative (PID) controller connected to a solid-state relay or other controller in order to provide automatic adjustment of the heat provided by the heating elements 110 to achieve a desired temperature of the specimen.

When activated, the heating elements 110 dissipate heat that is transferred to the sample holder element 140. The mounting adapter element 120 of the heated stage assembly 100 insulates the objective 75 from the heat emitted from the heating elements 110 to prevent damage or optical degradation of the optical element. The sample holder element 140 transmits the heat received from the heating elements 110 to both the slide 130 and the optical window holder element 160. Heat transmitted to the optical window holder element 160 is then transferred to one or more optical window elements 150 disposed within the cavity 165 of the conduit element 162. The optical window element 150 then may transfer heat to the top of the specimen. The optical window element 150 may directly contact the specimen or coverslip located over the specimen to transfer heat to the specimen. The slide 130 distributes heat to the specimen from the sides of the slide 130. Heat is uniformly distributed to the sides, bottom, and or top of the specimen.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described are to be taken as examples of embodiments. Elements and materials may be substituted for those illustrated and described, parts and processes may be reversed, and certain features of the invention may be utilized independently, all as would be apparent to one skilled in the art after having the benefit of this description of the invention. Changes may be made in the elements described without departing from the spirit and scope of the invention as described in the following claims.

The invention claimed is:

1. A microscopy system for heating a sample comprising:
   a heated stage assembly configured to be attached to a microscope stage holder, the heated stage assembly configured to position the sample over an objective lens, the heated stage assembly comprising:
   a mounting adapter element for attaching the heated stage assembly to a microscope stage holder;
   a sample holder element mounted within the mounting adapter element, the sample holder element including a first surface opposed to a second surface, the first surface including a sample receiving area configured to receive a microscope slide;
   one or more heating elements attached to the mounting adapter element and in contact with at least a portion of the second surface; and
   an optical window holder element disposed on the first surface and positioned above the sample receiving area and at least partially encloses an optical window element, wherein the optical window element contacts the sample and is heated by the optical window holder element configured to uniformly distribute heat to the sample.

2. The system of claim 1 further comprising an optical collar element positioned over the objective lens.

3. The system of claim 1, wherein the one or more heating elements are controlled by a proportional-integral-derivative (PID) controller.

4. The system of claim 1, wherein the sample holder element and the optical window holder element are each constructed from a thermally conductive material.

5. The system of claim 4, wherein the thermally conductive material is aluminum.

6. The system of claim 1, wherein the mounting adapter element comprises a thermally insulating material.

7. The system of claim 6, wherein the thermally insulating material is a polyoxymethylene.

8. The system of claim 1, wherein the heating elements are coupled to the sample holder element through a transparent thermally conducting paste or fluid.

9. The system of claim 1 further comprising one or more temperature sensors connected to the sample or the heated sample holder element.

10. The system of claim 9, wherein the one or more temperature sensors include a K-type thermocouple.

11. The system of claim 1, wherein the optical window is a glass or thermally conducting transparent plastic.

12. The system of claim 1 further comprising at least two optical window elements.

13. The system of claim 1, wherein the optical window element contacts a microscope coverslip or the microscope slide.

14. The system of claim 1, wherein the microscopy system comprises a fluorescence microscope.

* * * * *